United States Patent [19]
Penman

[11] 3,922,563
[45] Nov. 25, 1975

[54] SOLID STATE TOUCH OPERATED SWITCH

[76] Inventor: Richard E. Penman, 4189 S. 300 West Apt. 70, Ogden, Utah 84403

[22] Filed: Aug. 28, 1974

[21] Appl. No.: 501,378

[52] U.S. Cl. ....... 307/116; 200/DIG. 1; 317/DIG. 2
[51] Int. Cl.$^2$ ........................................ H01H 36/00
[58] Field of Search ....... 307/116, 308; 200/DIG. 1; 340/365 C, 258 C; 328/5; 317/DIG. 2

[56] References Cited

UNITED STATES PATENTS

| | | | |
|---|---|---|---|
| 3,549,909 | 12/1970 | Elmsford et al. | 328/5 |
| 3,651,391 | 3/1972 | Vogelsberg | 200/DIG. 1 |
| 3,748,496 | 7/1973 | Heidin et al. | 307/308 |

OTHER PUBLICATIONS

Lytel; L., *Handbook of Transistor & Circuits*, Howard W. Sams & Co., Inc., Indianapolis, Ind., 1967, Sect. 6, proximity switch ckt., page 88, 89.

*Primary Examiner*—Robert K. Schaefer
*Assistant Examiner*—M. Ginsburg
*Attorney, Agent, or Firm*—Lynn G. Foster

[57] ABSTRACT

A solid state touch operated electrical switch using a low voltage source of AC power supplied to a load and comprising a silicon controlled rectifier, connected at its anode to the output of the load, with a touch plate connected to the gate of the silicon controlled rectifier and the cathode of the silicon controlled rectifier at ground, whereby human contact with the plate causes current to flow across the silicon controlled rectifier thereby driving the load. A latching circuit which rectifies the low voltage AC to DC may be used so that once current flow across the silicon controlled rectifier is commenced, being initiated by touching of the plate, continued touching is not necessary.

6 Claims, 2 Drawing Figures

SOLID STATE TOUCH OPERATED SWITCH

BACKGROUND

1. Field of Invention

The present invention relates generally to low cost and highly reliable switches and more particularly to a solid state touch operated electrical switch designed for use in hospitals and nursing homes where ease of operation and sanitation are of utmost importance.

2. Prior Art

Prior art switches for controlling low voltage power have suffered variously from a number of problems including switch wear and bounce, damage to the load circuitry resulting from electrical shock, have been difficult to maintain and/or replace, have been relatively expensive and often have required warm up time, have required considerable pressure or other substantial physical action by the user and have consisted of a plurality of components.

BRIEF SUMMARY AND OBJECTS OF THE INVENTION

The present invention comprises an inexpensive highly reliable solid state touch operated electrical switch using a source of low voltage AC and driving a load, the switch comprising a touch plate connected to the gate of a silicon controlled rectifier the anode of which is connected to the load, the cathode of the silicon controlled rectifier being at ground potential. The switch of this invention may also be used with low voltage DC power.

With the foregoing in mind, it is a primary object of the present invention to provide a novel solid state touch operated electrical switch.

It is a further paramount object of the present invention to provide a switch comprising a silicon controlled rectifier connected at its anode to the output of a load, at its gate to a touch plate and at its cathode to ground whereby human contact with the touch plate will cause current to flow through the load and the silicon controlled rectifier.

These and other objects and features of the present invention will be apparent from the following detailed description, taken with reference to the accompanying drawings.

DETAILED DESCRIPTION OF THE ILLUSTRATED EMBODIMENTS

Figure 1:
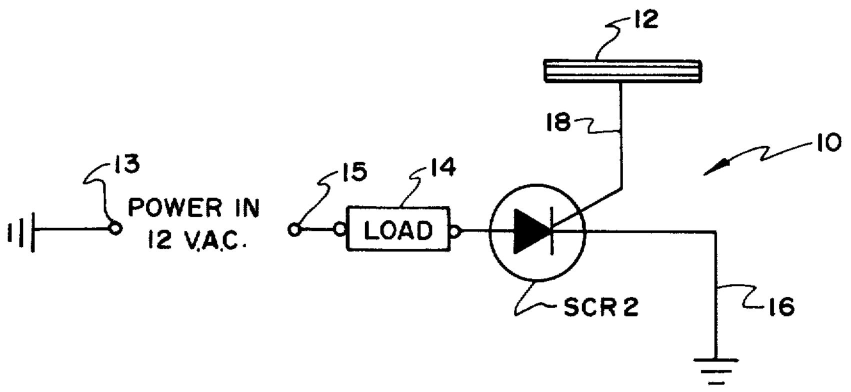
FIG. 1 is a circuit diagram of one presently preferred embodiment according to the present invention.

Reference is now made to FIG. 1 which illustrates a presently preferred solid state touch operated electrical switch 10. Twelve volt AC power is supplied to terminals 13, 15, terminal 13 being at ground potential and terminal 15 being electrically connected to the input of a load 14, the output of the load being connected to the anode of a silicon controlled rectifier SCR2. General Electric's silicon controlled rectifier No. C106Y2 is preferred, although others may be used without departing from the scope of the present invention.

The silicon controlled rectifier SCR2 is connected by conductor 18 at its gate to a touch plate 12 and at its cathode to ground by conductor 16 whereby current flows across the load 14 and the SCR2 only when the touch plate 12, which functions as a capacitor, is being touched by the human finger or the like. It is preferred that touch plate 12 comprise Bakelite insulation which is copper plated front and back. It has been found that switch 10 is particularly advantageous for use in hospitals and nursing homes where ease of operation and sanitation are of primary concern. The switch also has substantial utility in intercom and paging systems, pet entrances, where the animal using its nose can operate its own door thus eliminating the owner's inconvenience of attending the animal out of and into the house. Doorbells and other low voltage electrical switching applications are well served by switch 10.

Figure 2:
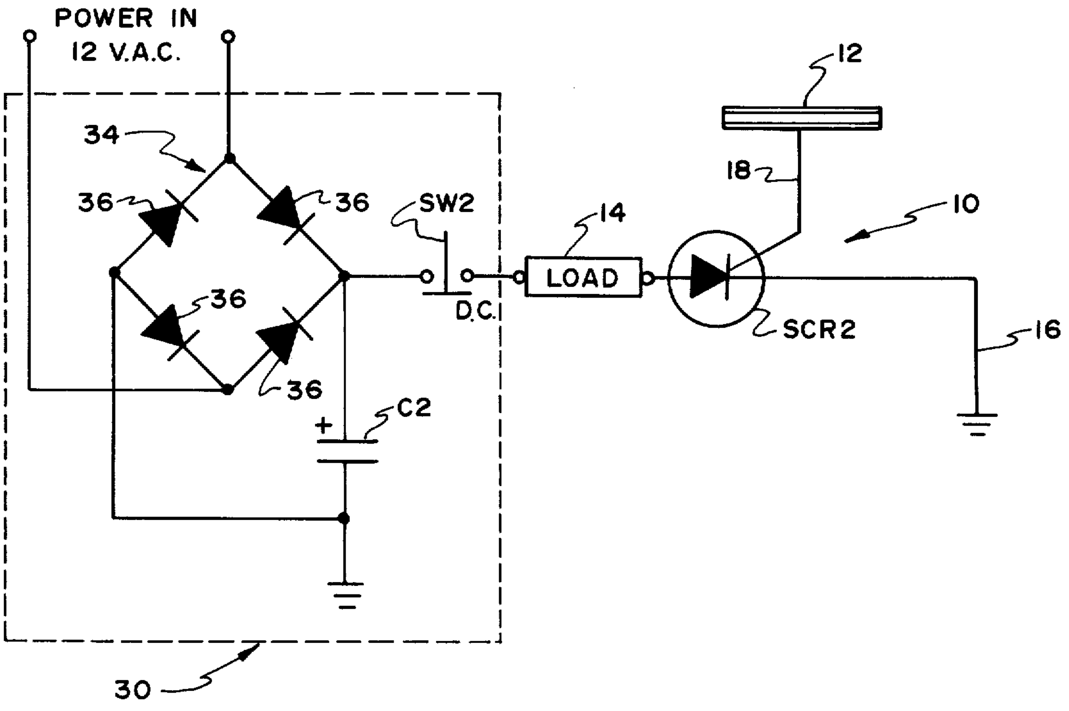
FIG. 2 is a second presently preferred embodiment of the present invention.

In order to eliminate the need to retain continuous human contact with the touch plate 12, a latching circuit 30 may be provided and interposed between the source of AC power and the input of the load 14, as illustrated in FIG. 2. While other latching circuits may be utilized, Motorola part No. HEP175 is presently preferred and comprises a diode bridge 34, which in turn comprises diodes 36, capacitor C2, which filters DC, and reset switch SW2. Thus, low voltage DC power is provided to the load and, once the sensor plate 12 is touched, the switch 10 remains closed and continues to communicate electrical energy to the load 14 notwithstanding removal thereafter of the human finger or the like from the touch plate 12. Actuation of the reset switch SW2 will open the circuit when it is desired to discontinue supplying electrical energy to the load 14.

From the foregoing it should be readily apparent that the present invention in its various embodiments provides no moving parts and no electrical contacts which are subject to wear or bounce. The likelihood of electrical shock upon the load is remote and any defective switch may be almost instantaneously replaced with only a nominal investment in labor and materials. The initial installation is also extremely low cost and no substantial physical effort or pressure is required to operate the switch. The amount of space required is negligible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A touch plate solid state switch comprising:

power input means for receiving low voltage electrical power and communicating said power to the input of a load;

a silicon controlled rectifier;

means solely and directly electrically connecting the output of the load to the anode of the silicon controlled rectifier;

touch plate means;

means solely and directly connecting the gate of the silicon controlled rectifier to the touch plate means;

means electrically connecting the cathode of the silicon controlled rectifier to ground.

2. A touch plate solid state switch according to claim 1 wherein the input low voltage electrical power is AC.

3. A touch plate solid state switch according to claim 1 wherein the low voltage input electrical power is DC.

4. A touch plate solid state switch according to claim 3 further comprising a latch circuit means to which AC low voltage electrical power is communicated and from which low voltage DC electrical power is communicated to said power input means.

5. A touch plate solid state switch according to claim 4 wherein said latch circuit comprises a reset switch.

6. A touch plate solid state switch comprising:
a load;
a silicon controlled rectifier;

means directly and solely electrically connecting the output of the load to the anode of the silicon controlled rectifier;
touch plate means;
means directly and solely electrically connecting the gate of the silicon controlled rectifier to the touch plate means;
means electrically connecting the cathode of the silicon controlled rectifier to ground;
a latching circuit comprising: AC electrical power input means and means rectifying AC power to DC power; and
means electrically connecting DC power from the latching circuit to the load.

* * * * *